T. F. WOODWARD.
Fruit-Jar Cover.

No. 101,958. Patented April 12, 1870.

Witnesses
Thomas J. Bewley
Samuel H. Rumer

Inventor
Theodore F. Woodward
By his atty. Stephen Ustick

United States Patent Office.

THEODORE F. WOODWARD, OF WINSLOW, NEW JERSEY, ASSIGNOR TO HAY & CO., OF PHILADELPHIA, PENNSYLVANIA.

Letters Patent No. 101,958, dated April 12, 1870.

IMPROVEMENT IN FASTENINGS FOR FRUIT-JARS.

The Schedule referred to in these Letters Patent and making part of the same.

I, THEODORE F. WOODWARD, of Winslow, in the county of Camden and State of New Jersey, have invented certain Improvements in Covers for Fruit-Jars, of which the following is a specification.

The nature of my invention consists in the construction of the cover with a central recess, and combining therewith a spring upon which the tightening-screw of the clamp presses in such a manner as to admit of the cover being sufficiently raised by the expansion of the air in the jar, when the latter is filled with fruit and heated, to allow the escape of the air. When the air has escaped, the cover, by the action of the spring, is again brought tight upon the gum packing-ring, making the jar air-tight for the preservation of the fruit.

To enable others skilled in the art to which my improvement appertains to make and use my invention, I will now give a detailed description thereof.

In the accompanying drawings, which make a part of this specification—

Like letters in all the figures indicate the same parts.

Figure 1:
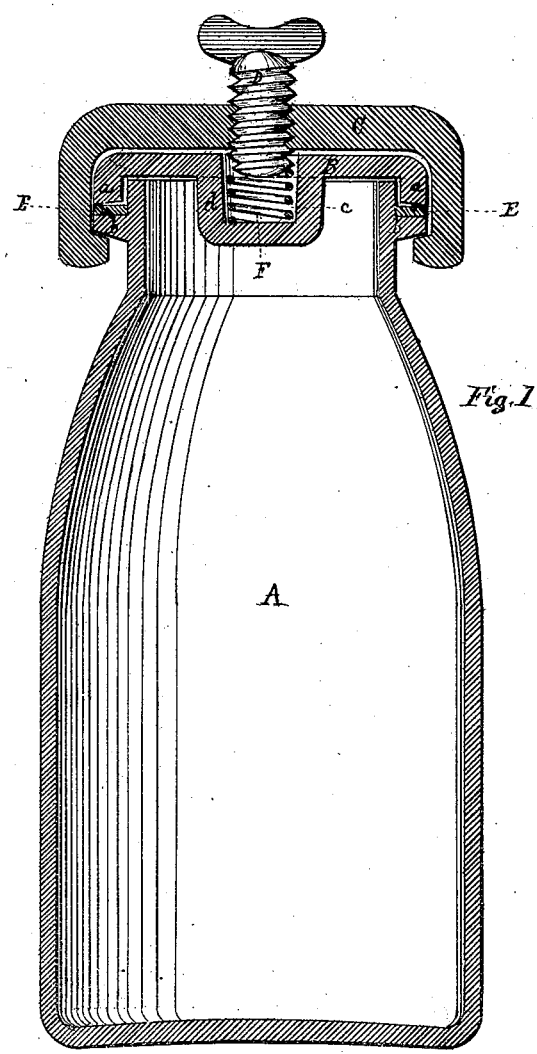
Figure 1 is a vertical section of a jar, with the improved cover in position.
Figure 2:
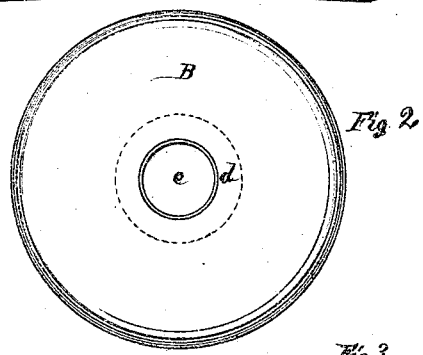
Figure 2 is a top or plan view of the cover B.
Figure 3:
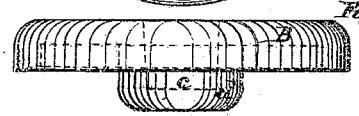
Figure 3 is an edge view of the same.

A, fig. 1, is the jar.

B is the cover of the same.

C is a clamp, having a tightening thumb-screw, D, for pressing the annular rim $a$ of the cover tight upon the gum packing-ring E, which is located on the flange $b$ of the jar.

The cover B has a recess, $c$, in the vertical projection $d$, which receives the spring F.

On the upper end of the spring, the end of the thumb-screw D presses in tightening the cover.

The object of the spring is to admit of the cover being slightly raised by the expansion of the air in the jar, when it is filled with fruit and heated in the usual manner of canning fruit, thus allowing the air to escape from the jar, the spring forcing the cover tight on the packing ring, when the force of the air is spent, and thus sealing the jar for the preservation of the fruit.

I do not confine myself to the use of a wire spring, F, as other forms of metallic springs may be used and answer the purpose; or a piece of gum or other yielding material may take the place of the metallic spring.

As freeing the fruit of air as much as possible is known to be of great importance to its preservation, it will plainly appear that the device above described being both simple and well adapted to the purpose, is of much utility.

The cover B may be made either of glass or metal, to suit the views of the manufacturer.

What I claim as new and desire to secure by Letters Patent, is—

The combination and arrangement of the jar A, cover B, having a recess, $c$, provided with a spring, F, the clamp C, screw D, and packing-ring E, substantially as and for the purpose above set forth.

In testimony that the above is my invention, I have hereunto set my hand and affixed my seal this 23d day of February, 1870.

THEODORE F. WOODWARD. [L. S.]

Witnesses:
CHAS. P. WESTCOTT,
B. C. VANAMAN.